United States Patent
Xiong et al.

(10) Patent No.: US 11,204,839 B2
(45) Date of Patent: Dec. 21, 2021

(54) MEMORY SYSTEM WITH LOW-LATENCY READ RECOVERY AND METHOD OF OPERATING THE MEMORY SYSTEM

(71) Applicant: SK hynix Inc., Gyeonggi-do (KR)

(72) Inventors: Chenrong Xiong, San Jose, CA (US); Fan Zhang, Fremont, CA (US); Haobo Wang, Sunnyvale, CA (US); Xuanxuan Lu, San Jose, CA (US); Meysam Asadi, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/796,783

(22) Filed: Feb. 20, 2020

(65) Prior Publication Data
US 2021/0263799 A1    Aug. 26, 2021

(51) Int. Cl.
*G06F 11/00* (2006.01)
*G06F 11/14* (2006.01)

(52) U.S. Cl.
CPC ...... *G06F 11/1415* (2013.01); *G06F 2201/85* (2013.01)

(58) Field of Classification Search
CPC . G11C 16/0483; G11C 16/08; G06F 11/1415; G06F 11/0727; G06F 11/1008; G06F 11/1435; G06F 11/1402; G06F 11/1616; G06F 11/2017; G06F 11/2089; G06F 2201/85
See application file for complete search history.

(56) References Cited

U.S. PATENT DOCUMENTS

| | | | |
|---|---|---|---|
| 9,183,085 B1* | 11/2015 | Northcott | G06F 11/1012 |
| 2013/0145229 A1* | 6/2013 | Frayer | G06F 11/1012 |
| | | | 714/755 |
| 2016/0299812 A1* | 10/2016 | Olbrich | G06F 11/1048 |
| 2017/0220415 A1* | 8/2017 | Hashimoto | G06F 11/1048 |
| 2019/0042150 A1 | 2/2019 | Wells et al. | |
| 2019/0042356 A1 | 2/2019 | Chen et al. | |
| 2019/0303236 A1* | 10/2019 | Ellis | G06F 11/1012 |
| 2020/0133567 A1* | 4/2020 | Hutchison | G06F 11/0757 |

OTHER PUBLICATIONS

"NVM Express Base Specification Revision 1.NEXTc", 2019.
Chris Petersen and Amber Huffma, "solving latency challenges with NVM Express SSDs at Scale", Proceedings of 2017 Flash Memory Summit, Aug. 9, 2017.

* cited by examiner

*Primary Examiner* — Joseph D Manoskey
(74) *Attorney, Agent, or Firm* — IP & T Group LLP (57) ABSTRACT

Multiple memory systems with respective decoders employ a low latency implementation of a read recovery level feature in decoding data. The decoding comprises receiving from a host a read request for decoding read data at a first recovery level by a first memory system, a first decoder of the first memory system being set at a second recovery level with a corresponding maximum iteration number when the read request is received by the first memory system; and operating the first decoder, after a set time elapses, to decode the read data at the second recovery level. A second decoder of a second memory system is set at the first recovery level for at least part of the time during which the first decoder operates to decode the read data at the second recovery level.

18 Claims, 9 Drawing Sheets

| Level | O/M | Description |
|---|---|---|
| 0 | O | |
| 1 | O | |
| 2 | O | |
| 3 | O | |
| 4 | M | Default |
| 5 | O | |
| 6 | O | |
| 7 | O | |
| 8 | O | |
| 9 | O | |
| 10 | O | |
| 11 | O | |
| 12 | O | |
| 13 | O | |
| 14 | O | |
| 15 | M | Fast Fail |

Maximum Recovery

Decreasing Amount of Recovery

Minimum Recovery

FIG. 5

| Read Recovery Level | 99.99% Read Latency @ Queue Depth 1 |
|---|---|
| Fail Fast | 200us |
| Higher Recovery Level | 400us |
| Even Higher Recovery Level | 1ms |

MEMORY SYSTEM WITH LOW-LATENCY READ RECOVERY AND METHOD OF OPERATING THE MEMORY SYSTEM

BACKGROUND

1. Field

Embodiments of the present disclosure relate to a low-latency implementation for read recovery in a memory system, particularly a solid state drive (SSD), and a method of operating the read recovery scheme.

2. Description of the Related Art

The computer environment paradigm has shifted to ubiquitous computing that can be used virtually anytime and anywhere. As a result, the use of portable electronic devices, such as mobile phones, digital cameras, and notebook computers has rapidly increased. These portable electronic devices generally use a memory system having memory device(s), that is, data storage device(s). A data storage device is used as a main memory device or an auxiliary memory device of the portable electronic devices.

Data storage devices used as memory devices provide excellent stability, durability, high information access speed, and low power consumption, since they have no moving parts. Examples of data storage devices having such advantages include universal serial bus (USB) memory devices, memory cards having various interfaces, and SSDs.

An SSD may include flash memory components and a controller, which includes the electronics that bridge the flash memory components to the SSD input/output (I/O) interfaces. An SSD controller may include an embedded processor that executes functional components such as firmware. SSD functional components are typically device specific, and in most cases, can be updated.

The two main types of flash memories are named after the respective NAND and NOR logic gates that configure them. The individual flash memory cells exhibit internal characteristics similar to those of their corresponding gates. NAND-type flash memory may be written to and read from in blocks (or pages) which are generally much smaller than the entire memory space. NOR-type flash memory allows a single machine word (byte) to be written to an erased location or read independently. NAND-type flash memory operates primarily in memory cards, USB flash drives, SSDs, and similar products, for general storage and transfer of data.

SSDs usually provide better random access performance than hard-disk drives. However, the performance of SSDs greatly depends on the ongoing workload. For read/write workloads, there may be frequent prohibitively high latencies, making SSDs considerably slower than hard-disk drives. In order to improve the Quality-of-Service (QoS) performance of SSDs, an optional Read Recovery Level (RRL) feature has been proposed in a recent NVM Express Specification. This feature is a configurable attribute to balance the completion time for execution of read commands with the amount of error recovery applied to those read commands. Thus, the RRL feature provides a trade-off between read time and power of error recovery.

In this context embodiments of the present invention arise.

SUMMARY

Embodiments of the present invention provide a low-latency implementation for a read recovery level feature in memory systems, particularly SSDs, that is able to achieve lower latency by avoiding redundant decoding operations.

An aspect of the present invention is directed to systems. One such system comprises first and second memory systems having first and second decoders, respectively, each of the first and second memory systems being configured to execute read commands received from a host, each read command being associated with one or more of a plurality of recovery levels, each of which directs decoding at a specific latency and decoding strength. The first memory system receives a read command for decoding data at a first recovery level, and when the read command is received, the first decoder is set at a second recovery level with a corresponding maximum iteration number, the first decoder operates to decode the data at the second recovery level after a set time elapses, and the second decoder is set at the first recovery level for at least part of the time during which the first decoder operates to decode the data at the second recovery level.

In another aspect, the present invention is directed to methods for decoding. One such method comprises receiving from a host a read request for decoding read data at a first recovery level by a first memory system, a first decoder of the first memory system being set at a second recovery level with a corresponding maximum iteration number when the read request is received by the first memory system; and operating the first decoder, after a set time elapses, to decode the read data at the second recovery level. A second decoder of a second memory system is set at the first recovery level for at least part of the time during which the first decoder operates to decode the read data at the second recovery level.

Additional aspects of the present invention will become apparent from the following description.

DETAILED DESCRIPTION

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

Figure 1:
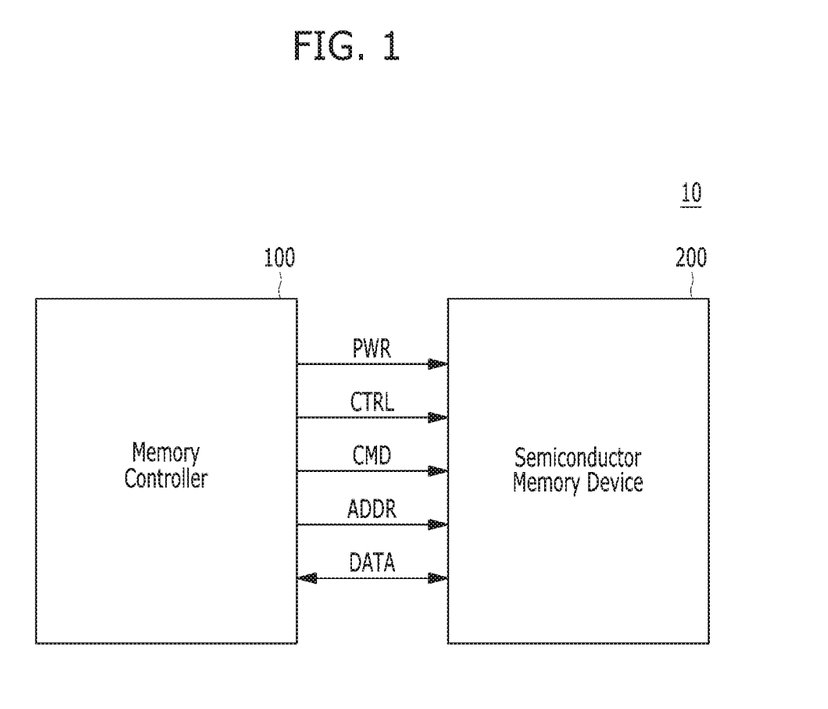
FIG. 1 is a block diagram illustrating a memory system in accordance with an embodiment of the present invention.

FIG. 1 is a block diagram schematically illustrating a memory system in accordance with an embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type. For brevity, memory controller 100 and semiconductor memory device 200 are sometimes simply referred to below as controller 100 and memory device 200, respectively.

The controller 100 may control overall operations of the memory device 200.

The memory device 200 may perform one or more erase, program, and read operations under the control of the memory controller 100. The memory device 200 may receive a command CMD, an address ADDR and data DATA through input/output (I/O) lines. The memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the memory system 10 is used in an SSD, operation speed of a host (not shown) coupled to the memory system 10 may remarkably improve.

In another embodiment, the memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC) card, and/or a universal flash storage (UFS).

In still another embodiment, the memory system 10 may be provided as one of various components in an electronic device, such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
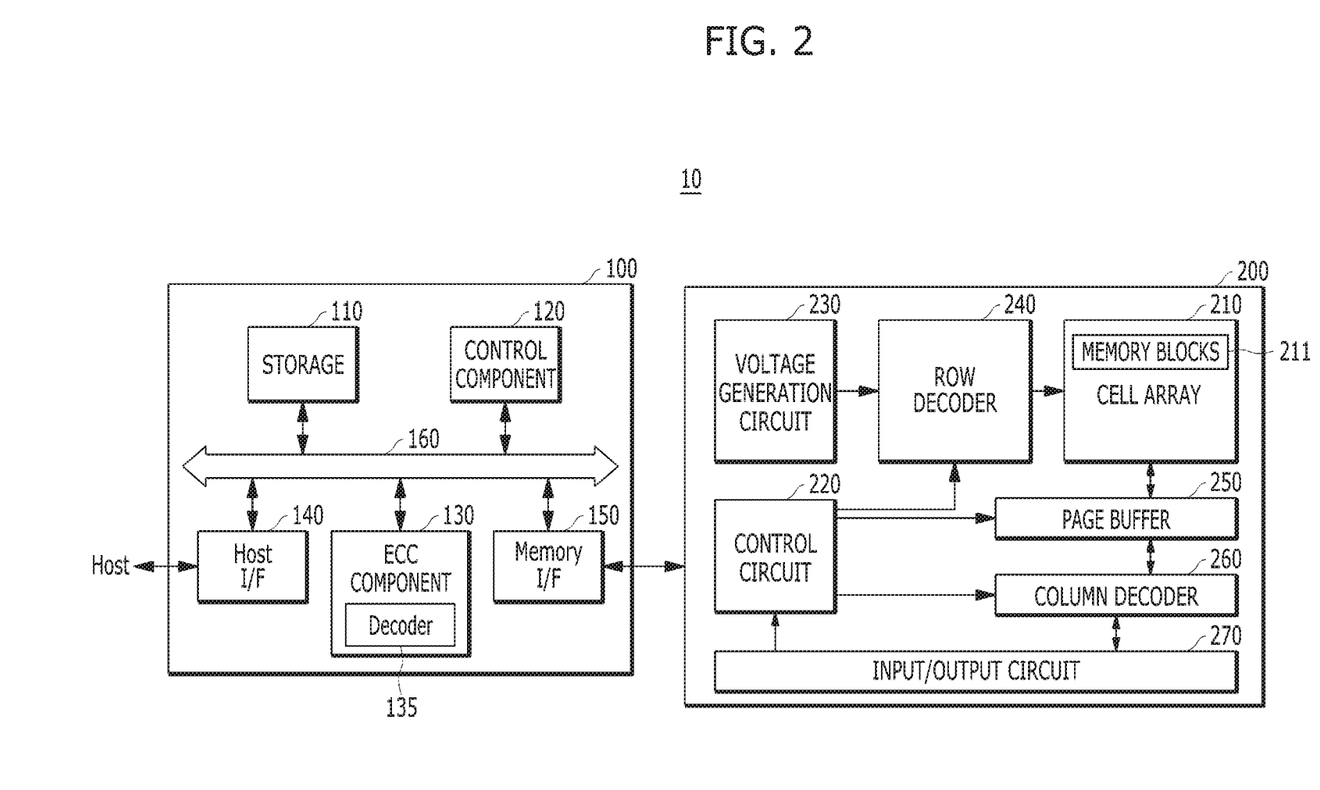
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented as any of various types of electronic devices. In some embodiments, the host device may include an electronic device, such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device, such as a mobile phone, a smart phone, an e-book, an MP3 player, a portable multimedia player (PMP), and/or a portable game player.

The memory device 200 may store data to be accessed by the host device.

The memory device 200 may be implemented as a volatile memory device, such as a dynamic random access memory (DRAM) and/or a static random access memory (SRAM) or a non-volatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor, e.g., a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented as a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations, such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure to correct the error bits.

The ECC component 130 may perform an error correction operation based on a coded modulation, such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM).

The ECC component 130 may include at least one decoder 135 and may include multiple decoders of different types, e.g., a bit-flipping (BF) decoder, a min-sum (MS) decoder or other suitable type of decoder. Thus, the ECC component 130 may include any and all circuits, systems or devices for suitable error correction operation, in accordance with embodiments of the present invention.

The host interface 140 may communicate with the host device through one or more of various interface protocols, such as a universal serial bus (USB), a multi-media card (MMC), a peripheral component interconnect express (PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component or CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
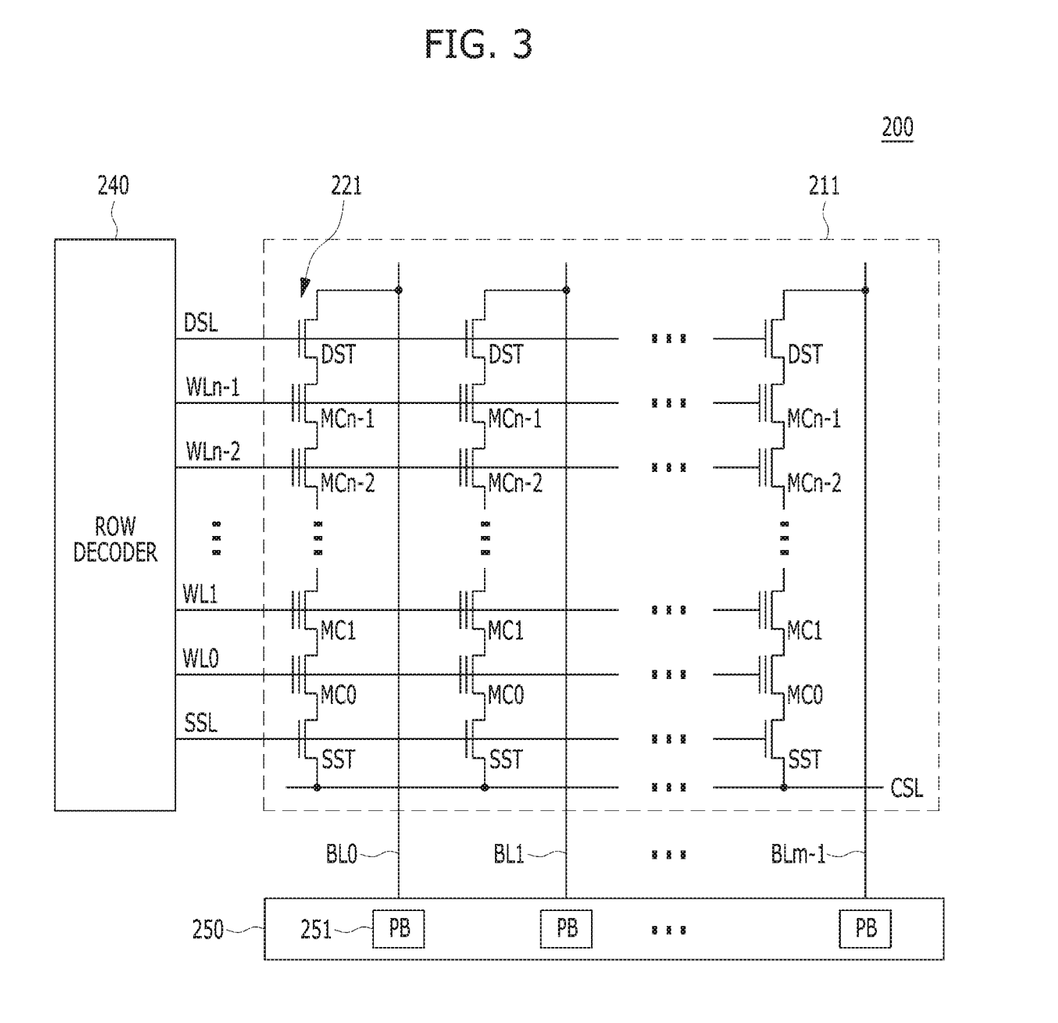
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer 250 may be in the form of a page buffer array including a plurality of page buffers 251 that are coupled to the bit lines BL0 to BL-1. The page buffers 251 may operate in response to page buffer control signals. For example, the page buffers 251 may temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

As previously noted, embodiments of the present invention provide a low-latency implementation for a Read Recovery Level (RRL) feature in memory systems, particularly SSDs. This implementation of RRL is able to achieve lower latency by avoiding redundant decoding operations.

Figure 4:
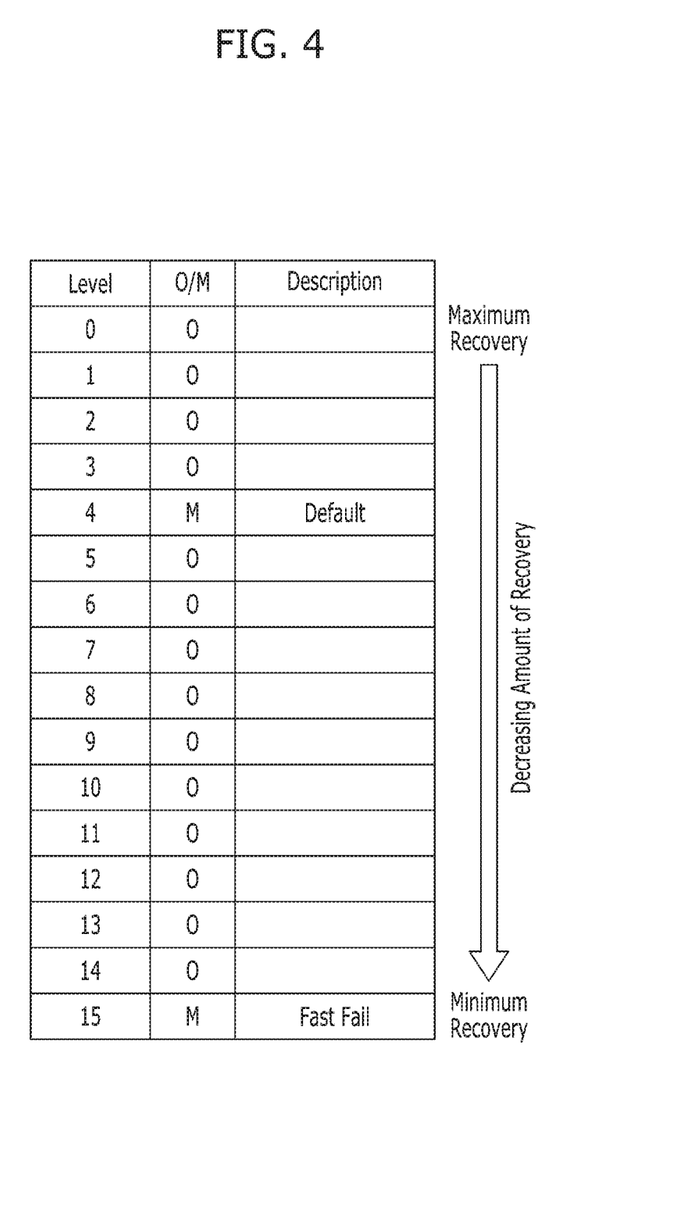
FIG. 4 is a schematic diagram illustrating a Read Recovery Level (RRL) feature of a memory system.

As shown in FIG. 4, the standard RRL feature supports 16 levels. Level 0 provides the most error correction power but has the longest read latency, while Level 15 provides the least error correction power but has the shortest read latency. Thus, both error correction power and read latency decrease from Level 0 to Level 15. For the standard RRL feature, Level 4, which is the default mode, and Level 15, which is the fast-fail (FF) mode, are mandatory, as indicated by "M" in the O/M column. Each of the other levels is optional, and hence each such level is denoted by "O" in the O/M column.

Figure 5:
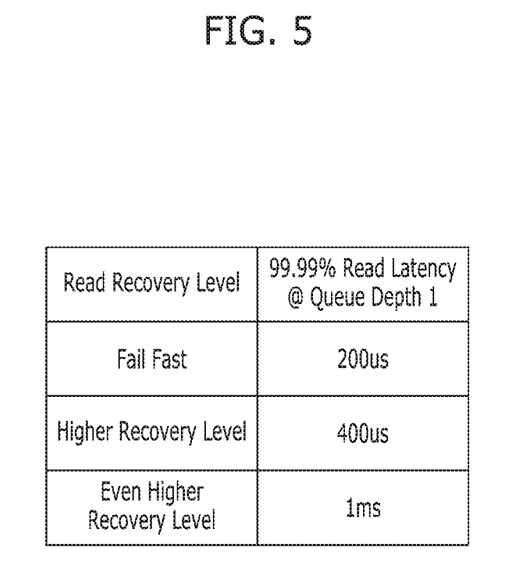
FIG. 5 is a schematic diagram illustrating different read latencies of different RRLs.

For data center applications, data centers keep multiple copies of data. When certain data is needed, a read command in FF mode is issued first for one copy of the data. If and when this FF mode fails, the host will try the FF mode again in requesting another copy of the data. If and when the FF mode requests for all copies of the data fail, another read command in default mode is issued for one copy of the data. In this way, data centers can achieve a better QoS performance since read latency of a higher recovery strength RRL is several times greater than that of a directly lower recovery strength RRL as shown in FIG. 5.

Figure 6:
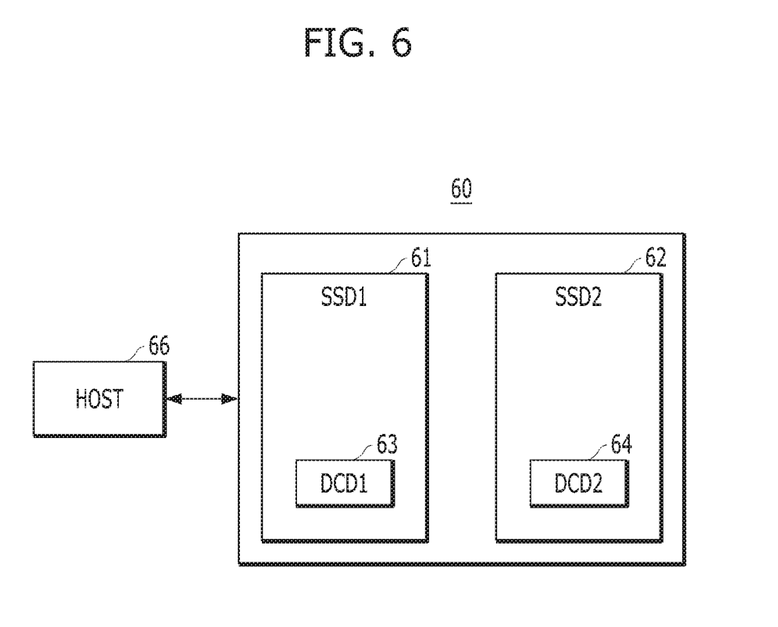
FIG. 6 is a block diagram of a system including multiple SSDs, each having a decoder.

Assume there are two copies of data in two different SSDs of a system. FIG. 6 is a block diagram showing such configuration. A system 60 includes a first SSD 61 (SSD1) and a second SSD 62 (SSD2). SSD1 61 includes a first decoder 63 (DCD1), and SSD2 62 includes a second decoder 64 (DCD2). Here, DCD1 63 and DCD2 64 are ECC decoders. The system 60 is in communication with a host 66, from which the system 60 receives commands and data.

Figure 7:
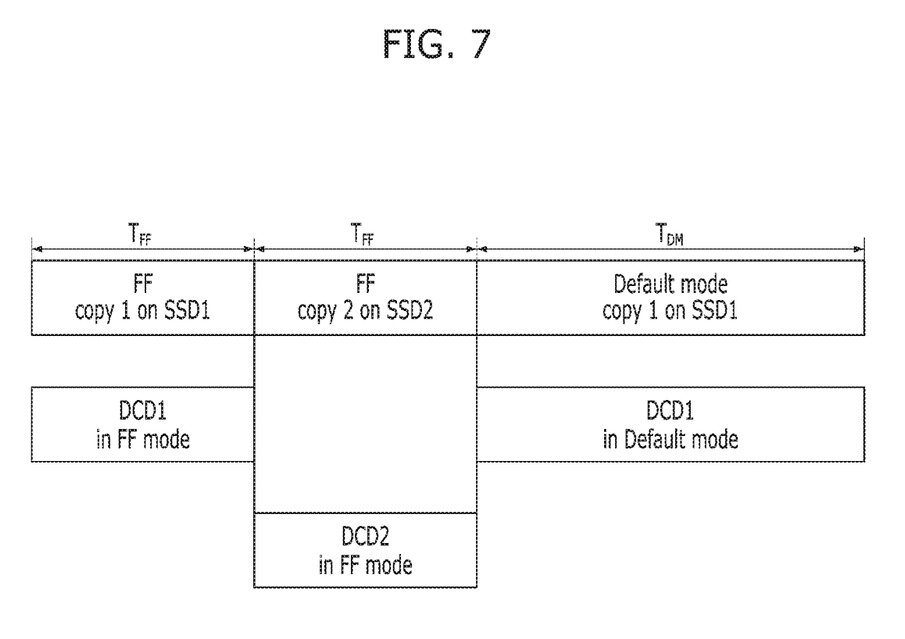
FIG. 7 is a timing diagram illustrating execution of RRL on a system with two SSDs, each having a decoder.

FIG. 7 shows a timing diagram on how RRL works in conventional processing in the context of the above-described arrangement and how decoding is carried out in the process. DCD1 needs $T_{DM}$ to generate the decoding result.

As shown in FIG. 7, data of copy1 on SSD1 61 is decoded by DCD1 63 twice. DCD1 63 terminates decoding after the FF mode applied on SSD1 61 fails. DCD1 63 then needs to perform another round of decoding in default mode. Thus, the total latency to get the decoded data is $(2*T_{FF}+T_{DM})$. For the first decoding trial of copy1 on SSD1 61, DCD1 63 is in FF mode with a relatively small maximum iteration number, $I_{FF}$. For the second decoding trial of copy1 on SSD1 61, DCD1 63 is in default mode with a larger maximum iteration number, $I_{DM}$.

As noted above, the RRL feature, which is used to improve the QoS performance of data centers, needs to support both default mode and FF mode. Of these two modes, FF mode has the shortest read latency and the weakest error recovery power; the default mode has a longer read latency with stronger error recovery power. If all FF mode requests for copies of all data fail, the default mode is needed to recover the data. Hence, as indicated above, in conventional processing some copies of data are decoded twice.

Embodiments of the present invention provide improvements on this RRL feature. To reduce the latency further, a scheme is provided that only needs to decode the data once to fulfill one FF mode read, one default mode read or even more RRLs.

Figure 8:
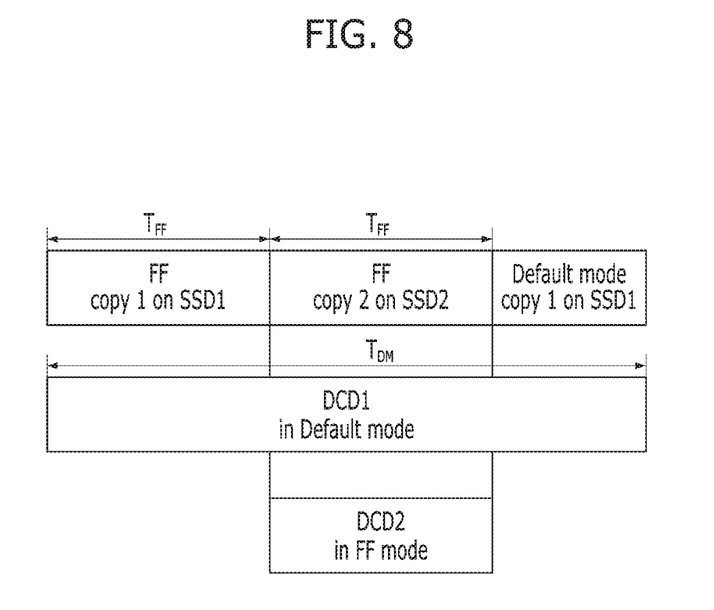
FIG. 8 is a timing diagram illustrating execution of RRL on a system with two SSDs, each having a decoder, in accordance with embodiments of the present invention.

FIG. 8 shows a timing diagram illustrating execution of RRL on the system shown in FIG. 6, in accordance with an embodiment of the present invention. Although the host 66 issues a read command along with a request that the read command be executed in FF mode to SSD1 61, DCD1 63 of SSC1 61 is still in default mode with the corresponding maximum iteration number of $I_{DM}$. When the time slot for decoding in FF mode in SSD1 61 expires, DCD1 63 issues a FF failure to SSD1 61 at the $I_{FF}$-th iteration, which represents the maximum number of iterations for FF mode. DCD1 63 continues its decoding procedure until the decoding result is available or it reaches the maximum iteration number $I_{DM}$. Meanwhile, SSD1 61 reports the FF failure to the host 66. As can be seen, the latency to get the requested data is only $T_{DM}$, which is much less than that of the scenario in FIG. 7.

Figure 9:
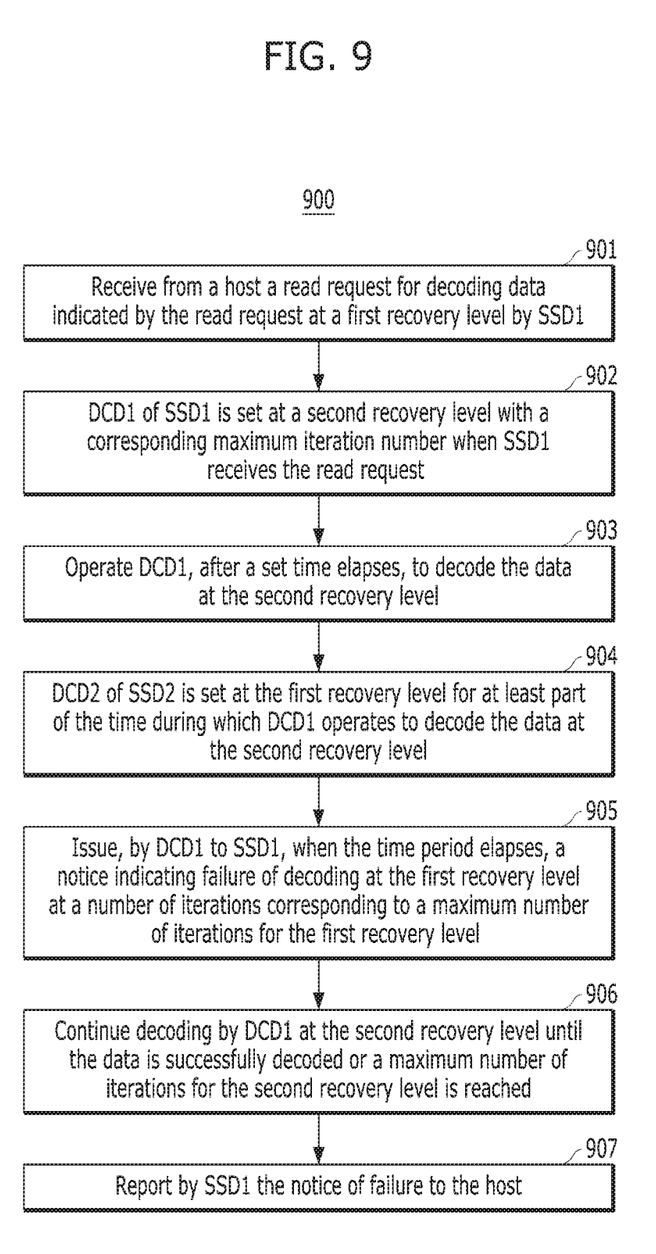
FIG. 9 is a flow chart illustrating steps in processes for decoding, in accordance with embodiments of the present invention.

Exemplary processing including decoding, according to an embodiment of the present invention, is shown in flow chart 900 of FIG. 9. Those skilled in the art will understand that additional and/or alternative steps may be performed, or that the order of steps may be changed, to effectuate aspects of the present invention without departing from the inventive concepts disclosed herein. The steps may be performed by any suitable component or combination of components consistent with the description and teachings herein. With that in mind, FIG. 9 is described with reference to other figures, particularly FIGS. 6 and 8.

Referring to FIG. 9, at step 901, a read request, e.g., a read command, issued by the host 66 is received by SSD1 61. At that time, DCD1 63 is set at a second recovery level, e.g., default mode, with $I_{DM}$ (step 902). After a set time period elapses, e.g., the time period for a first recovery level, e.g., FF mode, in SSD1 61 elapses, at step 903, DCD1 63 operates to decode the data at the second recovery level. For at least part of that decoding time, DCD2 64 is set at the first recovery level (step 904).

When the time period elapses, at step 905, DCD1 63 issues to SSD1 61 a notice indicating failure of decoding at the first recovery level at a number of iterations corresponding to $I_{FF}$. At step 906, DCD1 63 continues to decode at the second recovery level until the data is successfully decoded or $I_{DM}$ is reached. At step 907, SSD1 61 reports the notice of failure to the host 66.

As the foregoing demonstrates, embodiments of the present invention provide a low latency implementation for a read recovery level feature on multiple memory systems, e.g., an array of SSDs. Lower latency is achieved by avoiding redundant decoding operations. Embodiments of the present invention improve QoS performance on SSDs, particularly enterprise SSDs.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A system comprising:
   first and second memory systems storing first and second copies of data, respectively, and having first and second decoders, respectively, each of the first and second memory systems being configured to execute read commands received from a host, each read command being associated with one or more of a plurality of recovery levels, each of which directs decoding at a specific latency and decoding strength,
   wherein, when the first memory system receives, from the host, a read command for decoding the first copy of data at a first recovery level, the first decoder decodes the first copy of data at the first recovery level for a first time slot and sets a second time slot associated with a second recovery level, the second time slot longer than the first time slot;
   when the second memory system receives, from the host, a read command for decoding the second copy of data at the first recovery level in response to a decoding fail of the first decoder at the first recovery level, the second decoder decodes the second copy of data at the first recovery level for the first time slot; and
   when the first memory system receives, from the host, a read command for decoding the first copy of data at the second recovery level in response to a decoding fail of the second decoder at the first recovery level, the first decoder decodes the first copy of data at the second recovery level for a third time slot, which is determined based on the first and second time slots and is shorter than the second time slot.

2. The system of claim 1, wherein the third time slot is determined by subtracting two first time slots from the second time slot.

3. The system of claim 2, wherein, when the first time slot elapses, the first decoder issues to the first memory system a notice indicating failure of decoding at the first recovery level at a number of iterations corresponding to a maximum number of iterations for the first recovery level, which is less the maximum number of iterations for the second recovery level.

4. The system of claim 3, wherein the first decoder continues decoding at the second recovery level until the first copy of data is successfully decoded or the maximum number of iterations for the second recovery level is reached.

5. The system of claim 4, wherein the first memory system reports the notice indicating failure to the host.

6. The system of claim 1, wherein the first recovery level has a lower latency than the second recovery level.

7. The system of claim 1, wherein the first recovery level has a lower decoding strength than the second recovery level.

8. The system of claim 1, wherein the first recovery level is a fast fail mode and the second recovery level is a default mode.

9. The system of claim 1, wherein each of the first and second memory systems is a solid state drive (SSD).

10. A method for decoding in first and second memory systems storing first and second copies of data, respectively, and having first and second decoders, respectively, the method comprising:
    receiving, by the first memory system, from the host, a read command for decoding the first copy of data at a first recovery level;
    decoding, by the first decoder, the first copy of data at the first recovery level for a first time slot and setting a second time slot associated with a second recovery level, the second time slot longer than the first time slot;
    receiving, by the second memory system, from the host, a read command for decoding the second copy of data at the first recovery level in response to a decoding fail of the first decoder at the first recovery level;
    decoding, by the second decoder, the second copy of data at the first recovery level for the first time slot;
    receiving, by the first memory system, from the host, a read command for decoding the first copy of data at the second recovery level in response to a decoding fail of the second decoder at the first recovery level; and
    decoding, by the first decoder, the first copy of data at the second recovery level for a third time slot, which is determined based on the first and second time slots and is shorter than the second time slot.

11. The method of claim 10, wherein the third time slot is determined by subtracting two first time slots from the second time slot.

12. The method of claim 11, further comprising:
    issuing, by the first decoder to the first memory system, when the first time slot elapses, a notice indicating failure of decoding at the first recovery level at a number of iterations corresponding to a maximum number of iterations for the first recovery level, which is less the maximum number of iterations for the second recovery level.

13. The method of claim 12, further comprising:
    continuing decoding, by the first decoder, at the second recovery level until the first copy of data is successfully decoded or the maximum number of iterations for the second recovery level is reached.

14. The method of claim 13, further comprising:
    reporting, by the first memory system, the notice indicating failure to the host.

15. The method of claim 10, wherein the first recovery level has a lower latency than the second recovery level.

16. The method of claim 10, wherein the first recovery level has a lower decoding strength than the second recovery level.

17. The method of claim 10, wherein the first recovery level is a fast fail mode and the second recovery level is a default mode.

18. The method of claim 10, wherein each of the first and second memory systems is a solid state drive (SSD).

* * * * *